(12) United States Patent
Tocchetti

(10) Patent No.: US 10,307,809 B2
(45) Date of Patent: Jun. 4, 2019

(54) ASSEMBLY FOR AND METHOD OF MARKING AND CUTTING WIRES, AND MACHINE COMPRISING SAID ASSEMBLY

(71) Applicant: Cometo S.R.L., Annone Brianza (LC) (IT)

(72) Inventor: Pietro Tocchetti, Annone Brianza (IT)

(73) Assignee: COMETO S.R.L., Annone Brianza (LC) (IT)

( * ) Notice: Subject to any disclaimer, the term of this patent is extended or adjusted under 35 U.S.C. 154(b) by 656 days.

(21) Appl. No.: 14/897,747

(22) PCT Filed: Jun. 9, 2014

(86) PCT No.: PCT/IB2014/062068
§ 371 (c)(1),
(2) Date: Dec. 11, 2015

(87) PCT Pub. No.: WO2014/199280
PCT Pub. Date: Dec. 18, 2014

(65) Prior Publication Data
US 2016/0107215 A1    Apr. 21, 2016

(30) Foreign Application Priority Data
Jun. 14, 2013 (IT) .............................. TO2013A0492

(51) Int. Cl.
| B21C 51/00 | (2006.01) |
| B21F 11/00 | (2006.01) |
| B23D 15/00 | (2006.01) |
| B23K 35/02 | (2006.01) |
| B44B 5/00 | (2006.01) |

(52) U.S. Cl.
CPC ............ B21C 51/005 (2013.01); B21F 11/00 (2013.01); B23D 15/00 (2013.01); B23K 35/0216 (2013.01); B44B 5/0052 (2013.01)

(58) Field of Classification Search
CPC . B21F 11/00; B21F 13/00; B26D 7/26; B26D 2007/2685; B21C 51/005
USPC ........................................ 83/542, 582, 639.1
See application file for complete search history.

(56) References Cited

U.S. PATENT DOCUMENTS

| 3,242,852 A | 3/1966 | Kingsley |
| 3,638,712 A | 2/1972 | Rudov |
| 5,207,084 A * | 5/1993 | West ........................ B21F 11/00 72/407 |
| 7,010,953 B2 * | 3/2006 | Stupecky ............... B21D 39/04 72/402 |

FOREIGN PATENT DOCUMENTS

| DE | 3428949 A1 | 6/1985 |
| DE | 19650891 A1 | 8/1997 |

* cited by examiner

Primary Examiner — Pradeep C Battula
(74) Attorney, Agent, or Firm — Howson & Howson LLP

(57) ABSTRACT

Assembly for marking and cutting wires, comprising first cutting means (12), second cutter (14) facing the first cutter (12) and designed to cooperate with the first cutter (12) for cutting a wire (11), the first cutter (12) and the second cutting means (14) being designed to be moved in a direction (Y-Y) transverse to a direction (X-X) of feeding of the wire (11), wherein at least one of the first cutter (12) and the second cutter (14) comprises marking elements (13, 15) configured to mark the wire (11). A machine for marking and cutting wires and a method of marking and cutting wires are also provided.

10 Claims, 4 Drawing Sheets

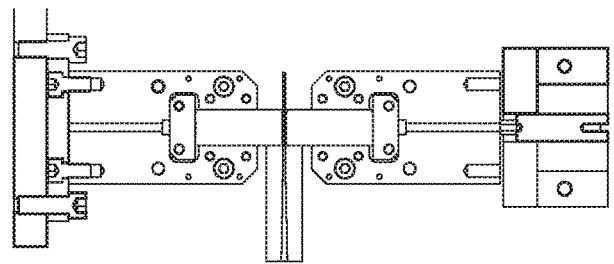
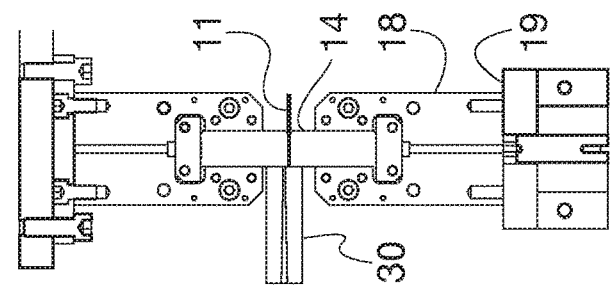
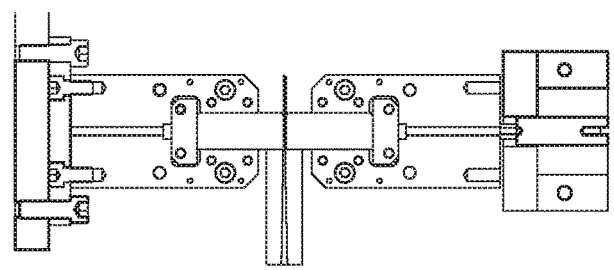
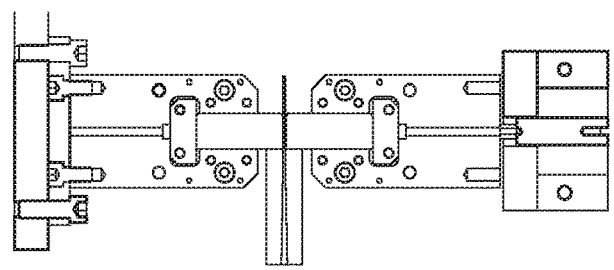
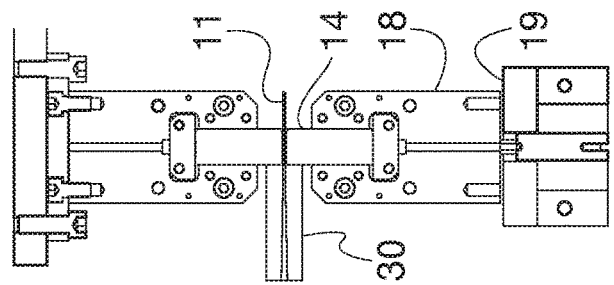

ASSEMBLY FOR AND METHOD OF MARKING AND CUTTING WIRES, AND MACHINE COMPRISING SAID ASSEMBLY

TECHNICAL SECTOR

The present invention relates, in general, to an assembly for marking and cutting wires, designed to cut to size and mark wires, for example in order to produce marked rods, and to a corresponding machine.

In particular, the present invention relates to a machine and to an assembly for marking and cutting wires in order to produce and mark rods used for welding.

PRIOR ART

Assemblies and machines for cutting wires, in particular metal wires, and assemblies for marking the cut rods are known.

The known wire cutting assemblies and rod marking assemblies operate in two successive and separate steps: a first wire cutting step, performed by a shearing unit, where the rod is cut to the desired length, and a subsequent rod marking step, performed by a marking assembly.

Other known wire cutting assemblies and rod marking assemblies consist of two separate machines: a shearing machine, which cuts the rod to the desired length, and a marking machine which is subsequently fed with the rods and performs marking.

The Applicant has identified a number of problems associated with the known assemblies and machines.

A first problem relates to the time required to perform the two wire cutting and rod marking operations in two successive steps.

A second problem, which is related to the first problem, is that the operation performed in two successive stages, or even using two different machines, requires a large amount of power.

A further problem of the known assemblies and machines is that the known marking assemblies are noisy, since the rods must be marked using oil-hydraulic cylinders.

The known assemblies, therefore, pose a variety of problems.

DESCRIPTION OF THE INVENTION

One object of the present invention is to provide an assembly and a machine for marking and cutting wires which solve the problem of cutting the wire and marking the rod thus obtained with a very fast turn-around, resulting in reduction in the time taken and power used compared to the solutions used in the prior art.

According to the present invention, this object and other objects are achieved by means of an assembly and a machine for marking and cutting wires of the type specified above and defined by the characterizing part of the accompanying claim 1.

It is to be understood that the accompanying claims form an integral part of the technical teachings provided here in the present description with regard to the invention.

BRIEF DESCRIPTION OF THE FIGURES

Further characteristic features and advantages of the invention will become clear from the following detailed description provided purely by way of a non-limiting example, with reference to the accompanying drawings in which:

FIG. 3a-3e shows a top plan view of an assembly for marking and cutting wires during the steps of a method for marking and cutting wires according to the present invention.

DESCRIPTION OF PREFERRED EMBODIMENTS

With reference to the figures, a wire marking and cutting assembly 10 in accordance with the present invention comprises first cutting means 12 and second cutting means 14 facing each other and designed to cooperate for cutting a wire, for example a metal steel wire.

Figures 1, 1A:
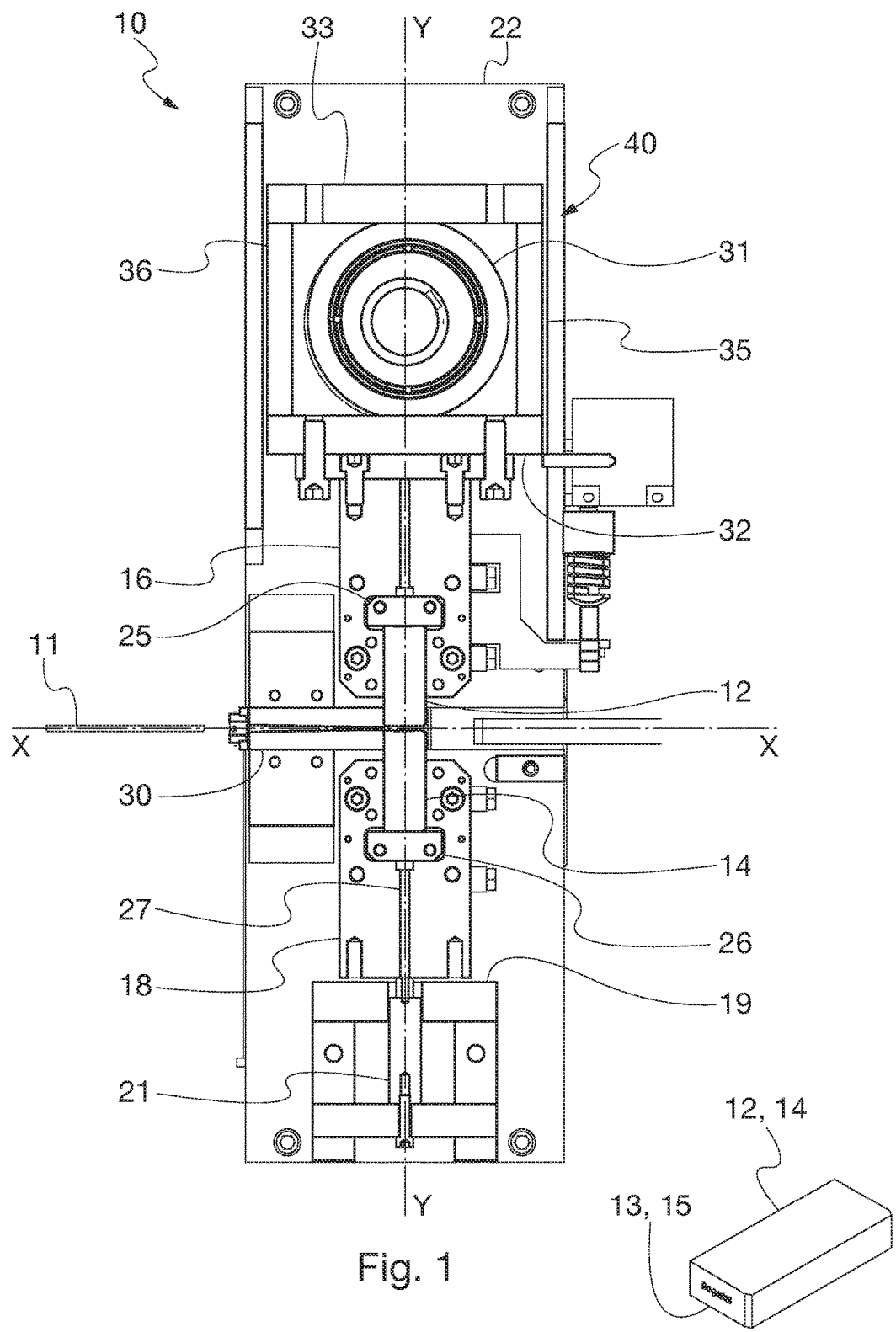
FIG. 1 shows a top plan view of an assembly for marking and cutting wires according to the present invention.
FIG. 1a shows a perspective view of a detail of an assembly for marking and cutting wires according to the present invention.

The first cutting means 12 and the second cutting means 14 comprise, respectively, first marking means 13 and second marking means 15, for example reliefs or incisions, shown in FIG. 1a, which are formed in a known manner on one side of the cutting means 12, 14.

Said first marking means 13 and second marking means 15 are designed to mark the wire 11 during the cutting operation.

In accordance with a variant of the invention, the marking means are present only on the first cutting means 12.

In accordance with a further variant of the invention, the marking means are present only on the second cutting means 14.

The first cutting means 12 and the second cutting means 14 are designed to be moved along a direction or axis Y-Y transverse to a direction or axis X-X for feeding of the metal wire.

Preferably, the first cutting means 12 and the second cutting means 14 are designed to be moved in the direction Y-Y perpendicular to the direction X-X of feeding of the metal wire.

Preferably, the first cutting means 12 and the second cutting means 14 are mounted slidably, for example on respective guides.

Preferably the cutting means 12 are motor-driven and are connected to actuating means 40 connected in turn to a motor 20, for example an electric motor, and designed to move the first cutting means 12 in the direction Y-Y.

The second cutting means 14 are mounted facing the first cutting means 12 and are configured to come up against an abutment 19 at the end of their movement in the direction Y-Y.

Preferably the second cutting means 14 are connected to resilient means 21, for example an opposition spring or a gas spring, such as a nitrogen cylinder spring or nitrogen spring, designed to bring the second cutting means 14 back into a starting position.

Preferably the first cutting means 12 and the second cutting means 14 are fixed respectively to a first motor-driven carriage 16 and to a second carriage 18 mounted slidably on respective guides connected to a support base 22.

The first carriage 16 and the second carriage 18 are designed to be moved along the direction or axis Y-Y transverse to the direction or axis X-X for feeding of the metal wire.

Preferably the first carriage 16 and the second carriage 18 are designed to be moved in the direction Y-Y perpendicular to the direction X-X of feeding of the metal wire.

Preferably, the first carriage 16 is motor-driven and is connected to the actuating means 40 which are connected in turn to the motor, for example an electric motor, and are designed to move the first carriage 16 in the direction Y-Y.

Preferably, the actuating means 40 comprise an eccentric element 31 which is designed to convert the rotational movement of the motor into a movement for displacement of the first carriage 16, a first bar 32, a second bar 33 and connection means 35, 36 designed to connect the bars 32, 33.

Alternatively, other devices may be used instead of the eccentric element 31, for example a cam system may be used.

The eccentric element 31 is mounted tangentially with respect to the first bar 32 and the second bar 33; the first bar 32 is fixed by known means, for example screwed, to the first carriage 16.

Preferably the connection means consist of a cross-piece 35; more preferably the first bar 32 is connected to the second bar 33 by two cross-pieces 35, 36.

In the preferred embodiment the eccentric element 31 moves the first cutting means 12 in the direction Y-Y.

During use, rotation of the eccentric element 31 or the cam is designed to move, depending on the sense of rotation of the motor, the first cutting means 12 and the second cutting means 14 upwards or downwards.

The first cutting means 12 and the second cutting means 14 are for example cutters of the known type and are made, for example, from special steel.

Preferably the wire marking and cutting assembly 10 in accordance with the present invention comprises a first motor-driven cutter 12 and a second cutter 14.

Preferably the second cutter 14 is connected to resilient means 21, for example an opposition spring or a gas spring, such as a nitrogen cylinder spring or nitrogen spring.

Preferably the first cutter 12 and the second cutter 14 are connected respectively to a first block 25 and to a second block 26 which are replaceable and which are in turn fixed to the first carriage 16 and to the second carriage 18 by known means, for example screws and bolts.

The blocks 25, 26 may be made in different sizes and are designed to adjust the position of the cutters 12, 14 in the direction of the axis Y-Y, so as to adapt the assembly 10 for use with wires of varying diameters.

The second block 26 is connected to the resilient means 21 by means of a screw 27; preferably the resilient means 21 are fixed to the abutment 19, for example they are inserted inside a seat formed in the abutment 19 and screwed tight.

Figure 2:
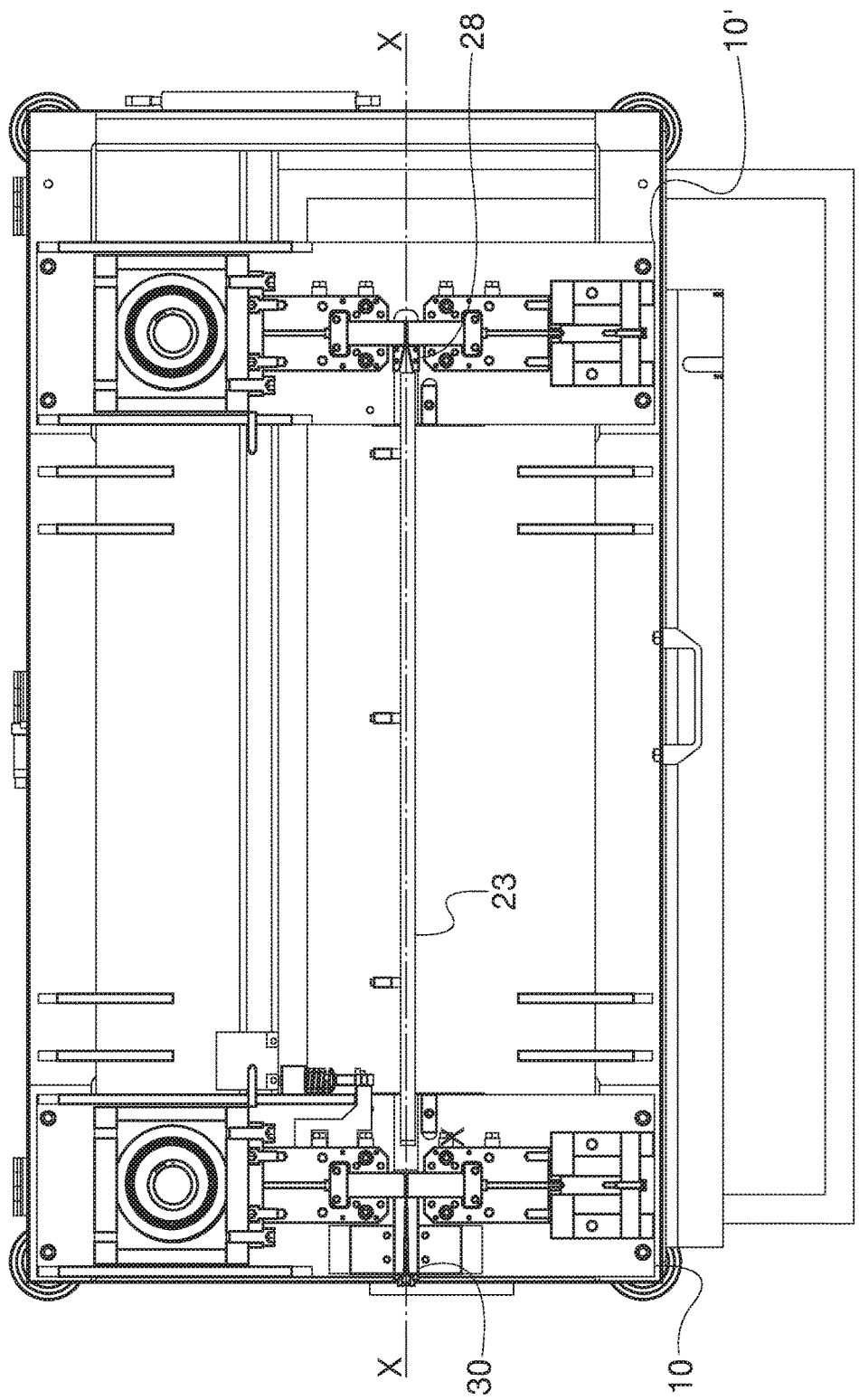
FIG. 2 shows a top plan view of a machine for marking and cutting wires according to the present invention.
Figure 4:
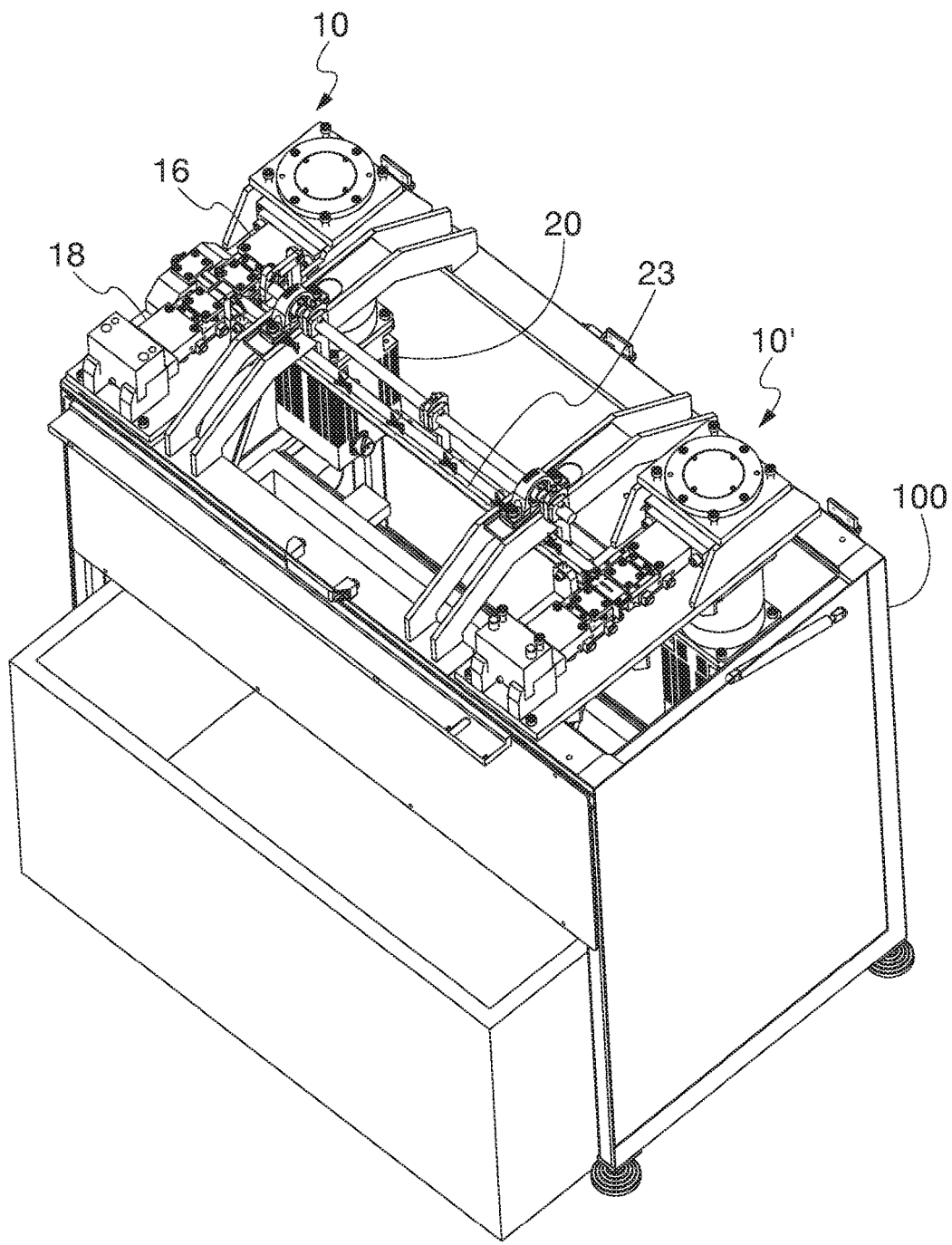
FIG. 4 shows a perspective view of a machine for marking and cutting wires according to the present invention.

FIGS. 2 and 4 show an embodiment of a wire marking and cutting machine 100 according to the invention.

The wire marking and cutting machine 100 comprises at least one assembly 10 and means 30 for guiding the wire, for example a guide bush 30, which are designed to guide the wire in the feeding direction X-X and position it between the first cutting means 12 and the second cutting means 14.

The machine 100 further comprises a support surface 23 for supporting the wire; the support surface 23 is furthermore designed to receive the bar at the end of the marking and cutting operation.

Preferably the support surface 23 is movable and with its movement is able to unload the bar at the end of the marking and cutting operation.

A second embodiment of the wire marking and cutting machine 100 according to the invention comprises two wire marking and cutting assemblies 10, 10' which are mounted so as to cause the wire to pass through the first cutting means and the second cutting means of the two assemblies.

In particular the machine 100 comprises a first wire marking and cutting assembly 10 according to the invention and a second wire marking and cutting assembly 10' according to the invention; the second assembly 10', while being the same as the first assembly 10, in this second embodiment is used for only marking the end of the wire 11.

The second assembly 10' is positioned at a distance from the first assembly 10 such as to allow the marking means of the second assembly to mark one end of the wire 11 when the cutting means and the marking means of the first assembly 10 performing cutting and marking at the opposite end of the wire.

Preferably the first assembly 10 and the second assembly 10' operate simultaneously on both ends of the wire 10.

Preferably the second embodiment of the wire marking and cutting machine 100 comprises a receiving system 28 for facilitating positioning of the wire between the cutting means of the second wire marking and cutting assembly 10'.

Preferably the second wire marking and cutting assembly 10' is mounted adjustably in the machine 100 so as to allow the cutting and marking of rods of different lengths.

The machine 100 according to the invention further comprises inside it electronic circuitry for managing and controlling (electronic circuitry) the operations of the assemblies 10, 10'.

The operating principle of the wire marking and cutting assembly 10 according to the invention, illustrated in FIG. 3, is now described.

During a step for feeding the wire 11, shown in FIG. 3a, the wire is fed using known means, for example a wire straightening unit and a feeder unit with oppositely arranged motor-driven rollers, and is inserted into the guiding means so as to be positioned along the feeding axis X-X between the first cutting means 12 and the second cutting means 14.

The feeder unit further comprises measurement means of the known type which are designed to measure the length of the wire fed, for example an encoder which, during a subsequent wire stopping step, causes stoppage of the advancing movement of the wire when it reaches a predetermined length.

Preferably the wire straightening unit and the feeder unit form part of a wire straightening machine which is external to the wire marking and cutting assembly 10 and the wire marking and cutting machine 100 according to the invention; in a preferred manner the wire straightening machine is arranged in line with the wire marking and cutting machine 100 according to the invention.

During these steps the wire is placed on the support surface 23.

This is followed by a step for the advancing movement of the cutting means, illustrated in FIG. 3b, in which the first motor-driven cutting means 12 are made to advance by the motor and by the actuating means 40 in the direction Y-Y until they come into contact with the wire.

Thereafter the step for cutting the wire 11 starts, as illustrated in FIG. 3c, and during the step the first cutting means 12 continue their movement along the direction of the axis Y-Y, cutting the wire and with their movement causing the cutting means 14 to move with them.

The cutting step is followed by a marking step, shown in FIG. 3d, during which the second cutting means 14 pushed by the first cutting means 12 are brought up against the abutment 19, and the marking means 15 compress and mark the wire 11.

Preferably, during this cutting step, the second carriage 18 comes up against the abutment 19.

During the cutting step and marking step shown in FIGS. 3c and 3d the second cutting means 14 are in contact with the wire 11 and are situated on the opposite side to the first cutting means 12 along the direction of the axis Y-Y.

During the last repositioning step, described in FIG. 3e, the first cutting means 12 are brought back into the starting position by the motor and by the actuating means 40 and the second cutting means 14 are brought back into the starting position by the resilient means 21.

Optionally there may also be an unloading step during which the support surface 23 is displaced, thus causing the marked rod to fall.

During the second embodiment of the wire marking and cutting machine 100 according to the invention the two marking assemblies 10 and 10' perform the same movements, with the difference that the second assembly 10', when the first assembly 10 performs the step for cutting the wire 11, merely displaces the free end of the wire 11, following the movement of the wire part which is cut by the assembly 10.

In all the embodiments described, with the assembly 10 and the machine 100 it is possible to perform advantageously cutting and marking of the wire in a single operation and using a single assembly or machine, with a reduction in the time taken and the amount of power used compared to the prior art.

Naturally, the description provided above may be subject to obvious modifications and/or variations as regards the dimensions, forms, materials, components, circuit elements and connections as well as the details of the design shown and the method of operation without departing from the invention as described in the claims below.

The invention claimed is:

1. A method for marking and cutting wires by using an assembly comprising a first cutter, a second cutter, and a fixed abutment, the second cutter facing said first cutter, being located between said first cutter and said fixed abutment, and being designed to cooperate with said first cutter for cutting a wire, at least one of said first and second cutters comprising reliefs or incisions formed in a face thereof, and said first and second cutters being designed to be moved in a direction transverse to a wire feeding direction and toward said fixed abutment, said method comprising the following steps:
   feeding the wire wherein the wire is positioned between the first cutter and the second cutter on a wire feeding axis;
   stopping the wire wherein wire feeding is interrupted when the wire has reached a predetermined length;
   advancing the first cutter toward the second cutter in the direction transverse to the wire feeding direction until the first and second cutters come into contact with the wire;
   cutting the wire wherein the first cutter continues movement in the direction transverse to the wire feeding direction, cutting the wire and moving the second cutter therewith;
   marking the wire with distinguishing markings when said reliefs or incisions confront a longitudinally-extending sidewall of the wire when the movement of said second cutter in the direction transverse to the wire feeding direction is halted due to said fixed abutment.

2. An assembly for marking and cutting wires, comprising a first cutter;
   a second cutter facing the first cutter and designed to cooperate with said first cutter for cutting a wire; and
   a fixed abutment positioned such that said second cutter is located between said first cutter and said abutment;
   said first cutter and said second cutter being movable in a direction transverse to a wire feeding direction, and toward said fixed abutment, for cutting the wire;
   at least one of said first cutter and said second cutter comprises reliefs or incisions formed in a face thereof that confronts a longitudinally-extending sidewall of the wire such that, when further movement of said second cutter in the direction transverse to the wire feeding direction is prevented due to said fixed abutment, distinguishing markings are formed in the sidewall of the wire by said reliefs or incisions.

3. A machine for marking and cutting wires, comprising at least one assembly for marking and cutting wires according to claim 2;
   wire guide means designed to guide the wire in the wire feeding direction and to position it between the first cutter and the second cutter;
   a motor designed to move said first cutter in the direction transverse to the wire feeding direction and toward said fixed abutment; and
   a support surface for supporting the wire.

4. The assembly for marking and cutting wires according to claim 3, wherein said direction transverse to the wire feeding direction is a direction perpendicular to the wire feeding direction.

5. The assembly for marking and cutting wires according to claim 3, further comprising a support base on which said first cutter, second cutter, and fixed abutment are mounted, wherein said first cutter and said second cutter are slidably mounted on said support base.

6. The assembly for marking and cutting wires according to claim 3, wherein said first cutter is connected to an actuator which is connected to a motor for driving the first cutter in the direction transverse to the wire feeding direction and toward said fixed abutment.

7. The assembly for marking and cutting wires according to claim 3, further comprising resilient means located between said second cutter and said fixed abutment for resiliently returning said second cutter to a starting position after engagement with said fixed abutment prevents further movement of said first and second cutter along said direction transverse to said wire feeding direction and the wire has been applied with the distinguishing markings.

8. The assembly for marking and cutting wires according to claim 7, wherein the resilient means is selected from the group consisting of a spring, an opposition spring, a gas spring, a nitrogen cylinder spring, and a nitrogen spring.

9. The assembly for marking and cutting wires according to claim 3, further comprising a first motor-driven carriage, a second carriage, and a support base on which the first motor-driven carriage, the second carriage, and the fixed abutment are mounted, wherein said first cutter is fixed to the first motor-driven carriage, the second cutter is fixed to the second carriage, and the first motor-driven carriage and the second carriage are slidably mounted relative to the support base.

10. The assembly for marking and cutting wires according to claim 3, wherein the distinguishing marks produced by said reliefs or incisions include indicia.

\* \* \* \* \*